United States Patent [19]

Blaner et al.

[11] Patent Number: 5,475,853
[45] Date of Patent: Dec. 12, 1995

[54] CACHE STORE OF INSTRUCTION PAIRS WITH TAGS TO INDICATE PARALLEL EXECUTION

[75] Inventors: Bartholomew Blaner, Newark Valley; Stamatis Vassiliadis, Vestal, both of N.Y.

[73] Assignee: International Business Machines Corporation, Armonk, N.Y.

[21] Appl. No.: 186,225

[22] Filed: Jan. 24, 1994

Related U.S. Application Data

[63] Continuation of Ser. No. 1,479, Jan. 7, 1993, abandoned, which is a continuation of Ser. No. 522,291, May 10, 1990, Pat. No. 5,214,763.

[51] Int. Cl.[6] .................................................. G06F 9/06
[52] U.S. Cl. .................. 395/800; 395/250; 395/375; 364/243.41; 364/DIG. 1
[58] Field of Search .................................. 395/375, 250, 395/800

[56] References Cited

U.S. PATENT DOCUMENTS

| | | | |
|---|---|---|---|
| 4,295,193 | 10/1981 | Pomerene | 395/375 |
| 4,847,755 | 7/1989 | Morrison et al. | 395/650 |
| 4,873,629 | 10/1989 | Harris et al. | 395/375 |
| 4,942,525 | 7/1990 | Shintani et al. | 395/375 |
| 5,241,641 | 8/1993 | Iwasa et al. | 395/425 |

FOREIGN PATENT DOCUMENTS

| | | |
|---|---|---|
| 0052194 | 5/1982 | European Pat. Off. . |
| 0238810 | 9/1987 | European Pat. Off. . |
| 0449661 | 10/1991 | European Pat. Off. . |
| 0454985 | 11/1991 | European Pat. Off. . |
| 0454984 | 11/1991 | European Pat. Off. . |
| 61-245239 | 10/1986 | Japan . |

OTHER PUBLICATIONS

Higbee, "Overlapped Operation with Microprogramming", *IEEE Transactions on Computers*, vol. C27, No. 3, Mar. 1978, pp. 270–275.

Wang et al., "Distributed Instruction Set Computer", *Proceedings of the International Conference on Parallel Processing*, vol. 1, Aug. 1988, pp. 426–429.

*Primary Examiner*—Ken S. Kim
*Attorney, Agent, or Firm*—Lynn L. Augspurger; Laurence J. Marhoefer

[57] ABSTRACT

A digital computer system capable of processing two or more computer instructions in parallel and having a cache storage unit for temporarily storing machine-level computer instructions in their journey from a higher-level storage unit of the computer system to the functional units which process the instructions. The computer system includes an instruction compounding unit located intermediate to the higher-level storage unit and the cache storage unit for analyzing the instructions and adding to each instruction a tag field which indicates whether or not that instruction may be processed in parallel with one or more neighboring instructions in the instruction stream. These tagged instructions are then stored in the cache unit. The computer system further includes a plurality of functional instruction processing units which operate in parallel with one another. The instructions supplied to these functional units are obtained from the cache storage unit. At instruction issue time, the tag fields of the instructions are examined and those tagged for parallel processing are sent to different ones of the functional units in accordance with the codings of their operation code fields.

14 Claims, 7 Drawing Sheets

| TAG 0 | INSTR. 0 | TAG 1 | INSTR. 1 | TAG 2 | INSTR. 2 | TAG 3 | INSTR. 3 |

FIG.2

| | | | | |
|---|---|---|---|---|
| M01 | 0 | 1 | 0 | 1 |
| M12 | 0 | 0 | 1 | 1 |
| TAG 0 | 1 | 1 | 1 | 1 |
| TAG 1 | 1 | 0 | 1 | 0 |
| TAG 2 | 1 | 1 | 0 | 1 |

FIG.6

| NO. | OP CODE | R/M | R/X | B | D | ACTION |
|---|---|---|---|---|---|---|
| I1 | LOAD | R2 | 0 | R7 | 0 | STORAGE → R2 (STORAGE ADDRESS = 0+R7+0) |
| I2 | ADD | R3 | R2 | 0 | 0 | R3 + R2 → R3 |
| I3 | COMPARE | R3 | R4 | 0 | 0 | R3 (c) R4 → CONDITION CODE |
| I4 | BRANCH ON CONDITION | 8 | 0 | R7 | 20 | ADDRESS (0+R7+20) TO INSTR. COUNTER IF CONDITION MET (CC=8) |
| I5 | STORE | R3 | 0 | R7 | 0 | R3 → STORAGE (ADDR.=0+R7+0) (IF CONDITION NOT MET) |

CACHE STORE OF INSTRUCTION PAIRS WITH TAGS TO INDICATE PARALLEL EXECUTION

This application is a continuation of application Ser. No. 08/001,479, filed Jan. 7, 1993, now abandoned, which is a continuation of copending application(s) Ser. No. 07/522,291 filed on May 10, 1990, now issued U.S. Pat. No. 5,214,763.

CROSS REFERENCE TO RELATED APPLICATIONS

The present United States patent application is related to the following U.S. patent applications:

(1) Application Ser. No: 07/579,384, (IBM Docket EN9-90-020), filed May 4, 1990, entitled "Scalable Compound Instruction Set Machine Architecture" the inventors being Stamatis Vassiliadis et al;

(2) Application Ser. No.: 07/519,382, now abandoned (IBM Docket EN9-90-019), filed May 4, 1990, entitled "General Purpose Compound Apparatus For Instruction-Level Parallel Processors", the inventors being Richard J. Eickemeyer et al;

(3) Application Ser. No: 07/504,190, now U.S. Pat. No. 5,057,940, (IBM Docket EN9-90-014), filed Apr. 4, 1990, entitled "Data Dependency Collapsing Hardware Apparatus", the inventors being Stamatis Vassiliadis et al.

These copending applications and the present application are owned by one and the same assignee, namely, International Business Machines Corporation of Armonk, N.Y.

The descriptions set forth in these copending applications are hereby incorporated into the present application by this reference thereto.

TECHNICAL FIELD

This invention relates to digital computers and digital data processors and particularly to digital computers and data processors capable of processing two or more instructions in parallel.

BACKGROUND OF THE INVENTION

The performance of traditional computers which execute instructions one at a time in a sequential manner has improved significantly in the past largely due to improvements in circuit technology. Such one-at-a-time instruction execution computers are sometimes referred to as "scalar" computers or processors. As the circuit technology is pushed to its limits, computer designers have had to investigate other means to obtain significant performance improvements.

Recently, so called "super scalar" computers have been proposed which attempt to increase performance by executing more than one instruction at a time from a single instruction stream. Such proposed super scalar machines typically decide at instruction execution time if a given number of instructions may be executed in parallel. Such decision is based on the operation codes (op codes) of the instructions and on data dependencies which may exist between adjacent instructions. The op codes determine the particular hardware components each of the instructions will utilize and, in general, it is not possible for two or more instructions to utilize the same hardware component at the same time nor to execute an instruction that depends on the results of a previous instruction a (data dependency). These hardware and ldata dependencies prevent the execution of some instruction combinations in parallel. In this case, the affected instructions are instead executed by themselves in a non-parallel manner. This, of course, reduces the performance of a super scalar machine.

Proposed super scalar computers provide some improvement in performance but also have disadvantages which it would be desirable to minimize. For one thing, deciding at instruction execution time which instructions can be executed in parallel takes a small, but noticeable, amount of time which cannot be very readily masked by overlapping it with other normal machine operations. This disadvantage becomes more pronounced as the complexity of the instruction set architecture increases. Another disadvantage is that the decision making must be repeated all over again each time the same instructions are to be executed a second or further time.

SUMMARY OF INVENTION

As discussed in copending application Ser. No. 07/519,384, now abandoned (IBM Docket EN9-90-020), one of the attributes of a Scalable Compound Instruction Set Machine (SCISM) is: Don't do the parallel execution decision making at execution time. Do it at an earlier point in the overall instruction handling process. For example, do it ahead of the instruction buffer in those machines which have instruction buffers or instruction stacks. For another example, do it ahead of the instruction cache in those machines which flow the instructions through a cache unit.

Another attribute of a SCISM machine is to record the results of the parallel execution decision making so that such results are available in the event that those same instructions are used a second or further time.

In one embodiment of the present invention, the recording of the parallel execution decision making is accomplished by generating tags which are added to or inserted into the individual instructions in an instruction stream. These tags tell whether the instructions can be executed in parallel or whether they need to be executed one at a time. This instruction tagging process is sometimes referred to herein as "compounding". It serves, in effect, to combine two or more individual instructions into a single compound instruction for parallel processing purposes.

In a particularly advantageous embodiment of the present invention, the computer is one which includes a cache storage mechanism for temporarily storing machine instructions in their journey from a higher-level storage unit of the computer to the instruction execution units of the computer and the compounding or instructing tagging process is performed intermediate to the higher-level storage unit and the cache storage mechanism so that there is stored in the cache storage mechanism both instructions and compounding tags. As is known, the use of a well-designed cache storage mechanism, in and of itself, serves to improve the overall performance of a computer. And the storing of the compounding tags into the cache storage mechanism enables the tags to be used over and over again so long as the instructions in question remain in the cache storage mechanism. As is known, instructions frequently remain in a cache long enough to be used more than once.

For a better understanding of the present invention, together with other and further advantages and features thereof, reference is made to the following description taken in connection with the accompanying drawings, the scope of the invention being pointed out in the appended claims.

BRIEF DESCRIPTION OF THE DRAWINGS

Referring to the drawings:

FIG. 2 shows a length of an instruction stream having compounding tags or tag fields associated with the instructions;

FIG. 6 is a table used in explaining the operation of the FIG. 5 example;

DESCRIPTION OF THE FIG. 1 EMBODIMENT

Figure 1:
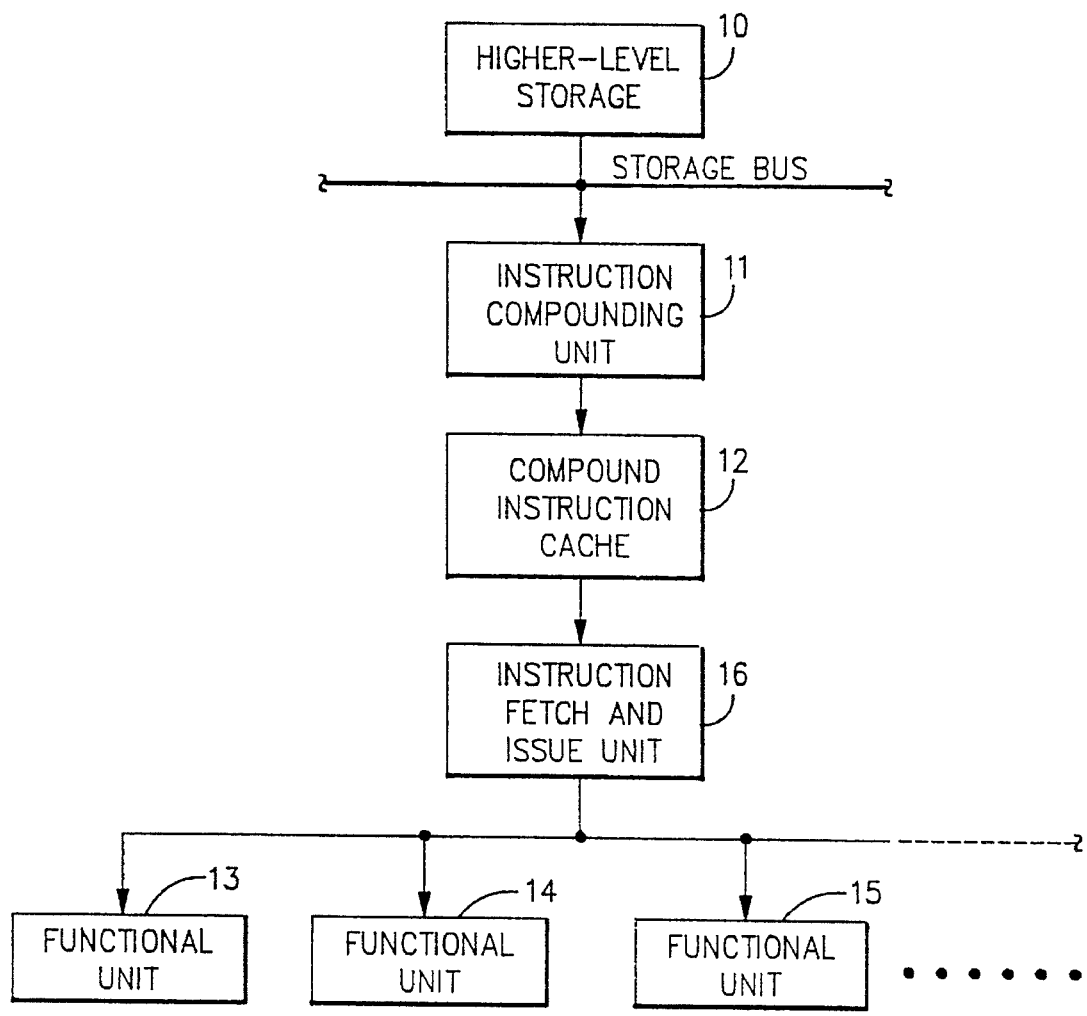
FIG. 1 shows a representative embodiment of a portion of a digital computer system constructed in accordance with the present invention.

Referring to FIG. 1 of the drawings, there is shown a representative embodiment of a portion of a digital computer system or digital data processing system constructed in accordance with the present invention. This computer system is capable of processing two or more instructions in parallel. It includes a first storage mechanism for storing instructions and data to be processed. This storage mechanism is identified as higher-level storage 10. This storage 10 is a larger-capacity, lower-speed storage mechanism and may be, for example, a large-capacity system storage unit or the lower portion of a comprehensive hierarchical storage system or the like.

The computer system of FIG. 1 also includes an instruction compounding mechanism for receiving instructions from the higher-level storage 10 and associating with these instructions tag fields which indicate which of these instructions may be processed in parallel with one another. This instruction compounding mechanism is represented by instruction compounding unit 11. This instruction compounding unit 11 analyzes the incoming instructions for determining which ones may be processed in parallel. Furthermore, instruction compounding unit 11 produces for these analyzed instructions tag information or tag fields which indicate which instructions may be processed in parallel with one another and which ones may not be processed in parallel with one another.

The FIG. 1 system further includes a second storage mechanism coupled to the instruction compounding mechanism 11 for receiving and storing the analyzed instructions and their associated tag fields. This second or further storage mechanism is represented by compound instruction cache 12. Cache 12 is a smaller-capacity, higher-speed storage mechanism of the kind commonly used for improving the performance rate of a computer system by reducing the frequency of having to access the lower-speed storage mechanism 10.

The FIG. 1 system further includes a plurality of functional instruction processing units which operate in parallel with one another. These functional instruction processing units are represented by functional units 13, 14, 15, et cetera. These functional units 13-15 operate in parallel with one another in a concurrent manner and each, on its own, is capable of processing one or more types of machine-level instructions. .Examples of functional units which may be used are:=a general purpose arithmetic and logic unit (ALU), an address generation type ALU, a data dependency colapsing ALU (per copending application Ser. No: 07/504, 190 (IBM Docket EN9-90-014) ), a branch instruction processing unit, a data shifter unit, a floating-point processing unit, and so forth. A given computer system may include two or more of some of these types of functional units. For example, a given computer system may include two or more general purpose ALU's. Also, no given computer system need include each and every one of these different types of functional units. The particular configuration of functional Units will depend on the nature of the particular computer system being considered.

The computer system of FIG. 1 also includes an instruction fetch and issue mechanism coupled to the compound instruction cache 12 for supplying adjacent instructions stored therein to different ones of the functional instruction processing units 13-15 when the instruction tag fields indicate that they may be processed in parallel. This mechanism is represented by instruction fetch and issue unit 16. Fetch and issue unit 16 fetches instructions from cache 12, examines their tag fields and operation code (op code) fields and, based upon such examinations, sends the instructions to the appropriate ones of the functional units 13-15.

If a desired instruction is resident in the compound instruction cache 12, the appropriate address is sent to the cache 12 to fetch therefrom the desired instruction. This is sometimes referred to as a "cache hit". If the requested instruction does not reside in cache 12, then it must be fetched from the higher-level storage 10 and brought into cache 12. This is sometimes referred to as a "cache miss". When a miss occurs, the address of the requested instruction is sent to the higher level storage 10. In response thereto, storage 10 commences the transfer out or read out of a line of instructions which includes the requested instruction. These instructions are transferred to the input of the instruction compounding unit 11, which unit proceeds to analyze these incoming instructions and generate the appropriate tag field for each instruction. The tagged instructions are thereafter supplied to the compound instruction cache 12 and stored therein for subsequent use, if needed, by the functional units 13, 14 and 15.

The instruction analysis performed in the instruction compounding unit 11 does require a certain relatively small amount of time. However, the instruction compounding analysis is performed only when an instruction cache miss occurs and is thus relatively infrequent.

FIG. 2 shows a portion of a stream of compounded or tagged instructions as they might appear at the output of the instruction compounding unit 11 of FIG. 1. As is seen, each instruction (Instr.) has a tag field added to it by the instruction compounding unit 11. The tagged instructions, like those shown in FIG. 2, are stored into the compound instruction cache 12. As needed, the tagged instructions in cache 12 are fetched by the instruction fetch and issue unit 16. As the tagged instructions are received by fetch and issue unit 16, their tag fields are examined to determine if they may be processed in parallel and their operation code (op code) fields are examined to determine which of the available functional units is most appropriate for their processing. If the tag fields indicate that two or more of the instructions are suitable for processing in parallel, then they are sent to the appropriate ones of the functional units in accordance with the codings of their op code fields. Such instructions are then processed concurrently with one another by their respective functional units.

When an instruction is encountered that is not suitable for parallel processing, then it is sent to the appropriate functional unit as determined by its op code and it is thereupon processed alone and by itself by the selected functional unit.

In the most perfect case, where plural instructions are always being processed in parallel, the instruction execution rate of the computer system would be N times as great as for the case where instructions are executed one at a time, with N being the number of instructions in the groups which are being processed in parallel.

DESCRIPTION OF FIG. 3 INSTRUCTION COMPOUNDING UNIT

Figure 3:
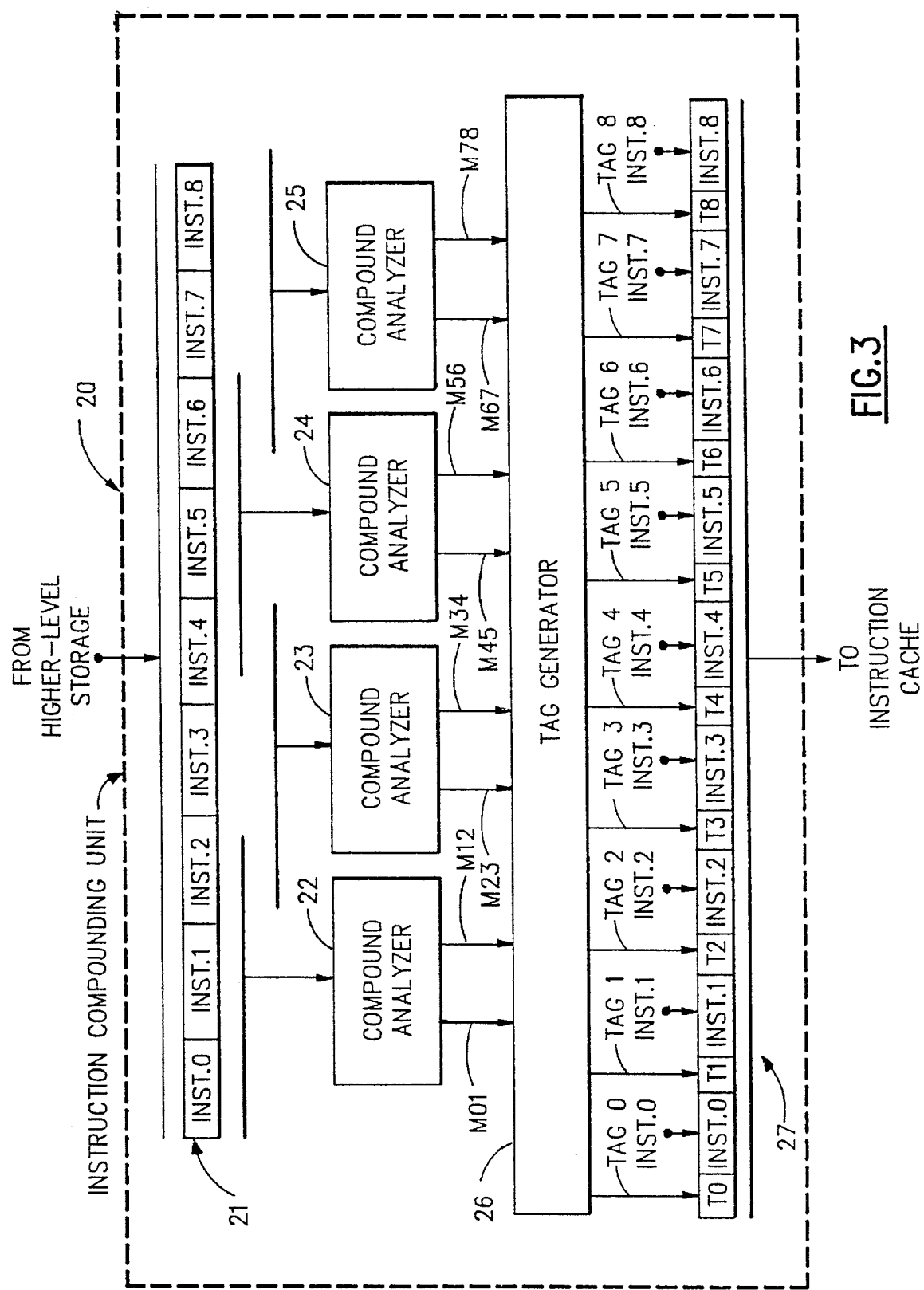
FIG. 3 shows in greater detail the internal construction of a representative embodiment of an instruction compounding unit which can be used in the computer system of FIG. 1.

FIG. 3 shows in greater detail the internal construction of a representative embodiment of an instruction compounding unit constructed in accordance with the present invention. This instruction compounding unit 20 is suitable for use as the instruction compounding unit 11 of FIG. 1. The instruction compounding unit 20 of FIG. 3 is designed for the case where a maximum of two instructions at a time may be processed in parallel. In this case, a one-bit tag field is used. A tag bit value of "one" means that the instruction is a "first" instruction. A tag bit value of "zero" means that the instruction is "second" instruction and may be executed in parallel with the proceeding first instruction. An instruction having a tag bit value of one may be executed either by itself or at the same time and in parallel with the next instruction, depending on the tag bit value for such next instruction.

Each pairing of an instruction having a tag bit value of one with a succeeding instruction having a tag bit value of zero forms a compound instruction for parallel execution purposes, that is, the instructions in such a pair may be processed in parallel with one another. When the tag bits for two succeeding instructions each have a value of one, the first of these instructions is executed by itself in a nonparallel manner. In the worst possible case, all of the instructions in the sequence would have a tag bit value of one. In this worst case, all of the instructions would be executed one at a time in a nonparallel manner.

The instruction compounding unit 20 of FIG. 3 includes a plural-instruction instruction register 21 for receiving a plurality of successive instructions from the higher-level storage unit 10. Instruction compounding unit 20 also includes a plurality of rule-based instruction analyzer mechanisms. Each such instruction analyzer mechanism analyzes a different pair of side-by-side instructions in the instruction register 21 and produces a compoundability signal which indicates whether or not the two instructions in its pair may be processed in parallel. In FIG. 3, there are shown a plurality of compound analyzer units 22-25. Each of these compound analyzer units 22-25 includes two of the instruction analyzer mechanisms just mentioned. Thus, each of these analyzers units 22-25 produces two of the compoundability signals. For example, the first compound analyzer unit 22 produces a first compoundability signal M01 which indicates whether or not Instructions 0 and 1 may be processed in parallel. Compound analyzer unit 22 also produces a second compoundability signal M12 which indicates whether or not Instructions 1 and 2 may be processed in parallel.

In a similar manner, the second compound analyzer unit 23 produces a first compoundability signal M23 which indicates whether or not Instructions 2 and 3 may be processed in parallel and a second compoundability signal M34 which indicates whether Instructions 3 and 4 may be processed in parallel. The third compound analyzer 24 produces a first compoundability signal M45 which indicates whether or not Instructions 4 and 5 may be processed in parallel and a second compoundability signal M56 which indicates whether or not Instructions 5 and 6 may be processed in parallel. The fourth compound analyzer 25 produces a first compoundability signal M67 which indicates whether or not Instructions 6 and 7 maybe processed in parallel and a second compoundability signal M78 which indicates whether Instructions 7 and 8 may be processed in parallel.

The instruction compounding unit 20 further includes a tag generating mechanism 26 responsive to the compoundability signals appearing at the outputs of the analyzer units 22-25 for generating the individual tag fields for the different instructions in the instruction register 21. These tag fields T0, T1, T2, etc. are supplied to a tagged instruction register 27, as are the instructions themselves, the latter being obtained from the input instruction register 21. In this manner, there is provided in the compounding unit output register 27 a tag field T0 for Instruction 0, a tag field T1 for Instruction 1, etc.

In the present embodiment, each tag field T0, T1, T2, etc. is comprised of a single binary bit. A tag bit value of "one" indicates that the immediately following instruction to which it is attached is a "first" instruction. A tag bit value of "zero" indicates that the immediately following instruction is a "second" instruction. An instruction having a tag bit value of one followed by an instruction having a tag bit value of zero indicates that those two instructions may be executed in parallel with one another. The tagged instructions in the compounding unit output register 27 are supplied to the input of the compound instruction cache 12 of FIG. 1 and are stored into such compound instruction cache 12.

It should be noted that the amount of register hardware shown in FIG. 3 can be reduced by storing the compound instructions directly to the compound instruction cache.

Figure 4:
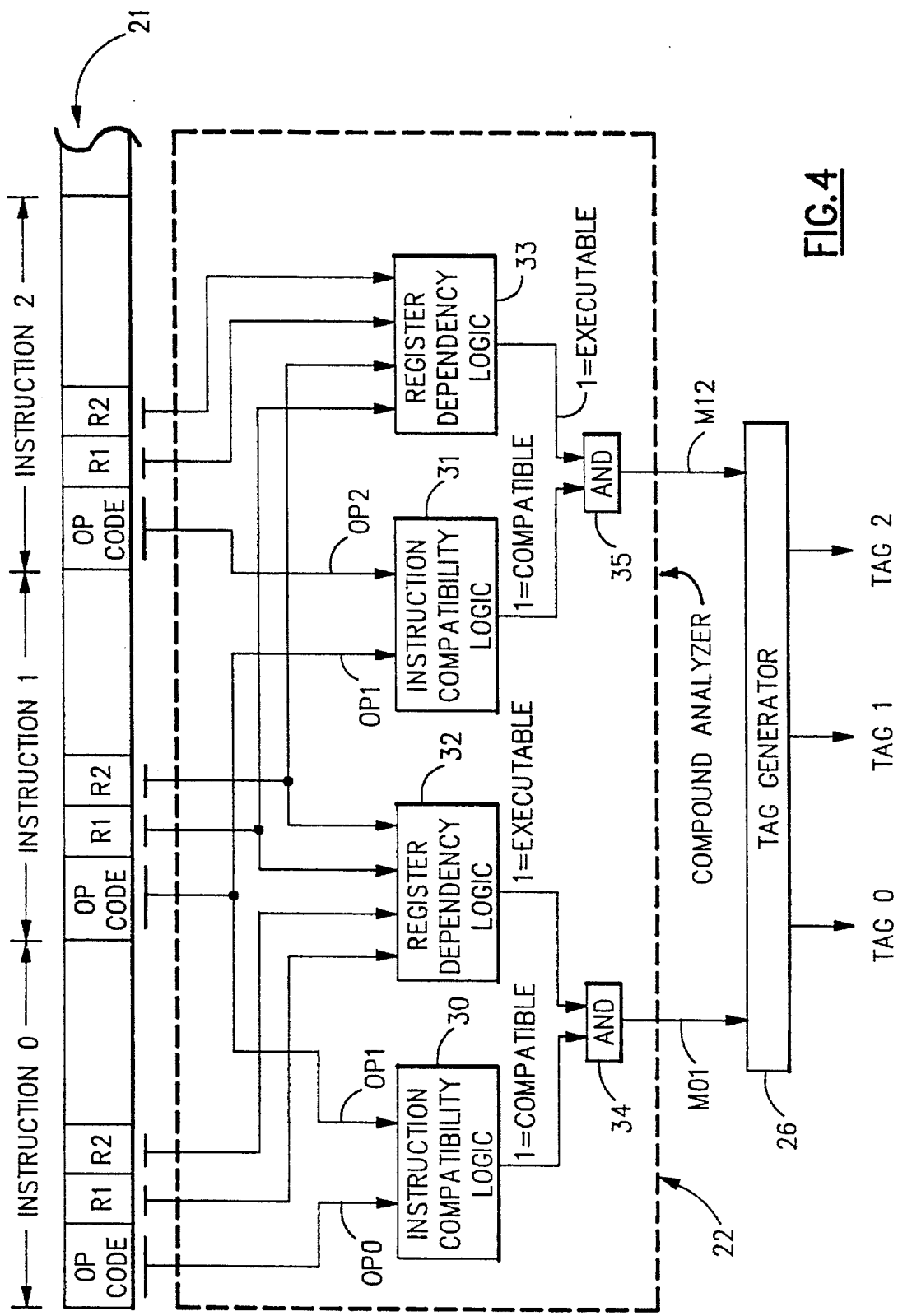
FIG. 4 shows in greater detail a representative internal construction for each of the compound analyzer units of FIG. 3.

Referring now to FIG. 4, there is shown in greater detail the internal construction used for the compound analyzer unit 22 of FIG. 3. The other compound analyzer units 23-25 are of a similar construction. As shown in FIG. 4, the compound analyzer 22 includes instruction compatibility logic 30 for examining the op code of Instruction 0 and the op code of Instruction 1 and determining whether these two op codes are compatible for purposes of execution in parallel. Logic 30 is constructed in accordance with predetermined rules to select which pairs of op codes are compatible for execution in parallel. More particularly, logic 30 includes logic circuitry for implementing rules which define which types of instructions are compatible for parallel execution in the particular hardware configuration used for the computer system being considered. If the op codes for Instructions 0 and 1 are compatible, then logic 30 produces at its output a binary one level signal. If they are not compatible, logic 30 produces a binary zero value on its output line.

Compound analyzer 22 further includes a second instruction compatibility logic 31 for examining the op codes of Instructions 1 and 2 and determining whether they are compatible for parallel execution. Logic 31 is constructed in the same manner as logic 30 in accordance with the same predetermined rules used for logic 30 to select which pairs of op codes are compatible for execution in parallel for the case of Instructions 1 and 2. Thus, logic 31 includes logic circuitry for implementing rules which define which types of instructions are compatible for parallel execution, these rules being the same as those used in logic 30. If the op codes for Instructions 1 and 2 are compatible, then logic 31 produces a binary one level output. Otherwise, it produces a binary zero level output.

Compound analyzer 22 further includes first register dependency logic 32 for detecting conflicts in the usage of the general purpose registers designated by the R1 and R2 fields of Instructions 0 and 1. These general purpose registers will be discussed in greater detail hereinafter. Among other things, dependency logic 32 may be constructed to detect the occurrence of a data dependency condition wherein a second instruction (Instruction 1) needs to use the results obtained by the performance of the proceeding instruction (Instruction 0). In this case, either the second instruction can be executed by the dependency collapsing hardware, thus executing in parallel with the first instruction, or the execution of the second instruction must await completion of the execution of the preceeding instruction and, hence, cannot be executed in parallel with the preceeding instruction. (It is noted that a technique for circumventing some data dependencies of this type will be discussed hereinafter.) If there are no register dependencies which prevent execution of Instructions 0 and 1 in parallel, then the output line of logic 32 is given a binary value of one. If there is a dependency, then it is given a binary value of zero.

Compound analyzer 22 further includes second register dependency logic 33 for detecting conflicts in the usage of the general purpose registers designated by the R1 and R2 fields of Instructions 1 and 2. This logic 33 is of the same construction as the previously discussed logic 32 and produces a binary one level output if there are no register dependencies or the register dependencies can be executed by the data dependency collapsing hardware, and a binary zero level output otherwise.

The output lines from the instruction compatibility logic 30 and the register dependency logic 32 are connected to the two inputs of an AND circuit 34. The output line of AND 34 has a binary one value if the two op codes being considered are compatible and if there are no register dependencies. This binary one value on the AND 34 output line indicates that the two instructions being considered are compoundable, that is, are executable in parallel. If, on the other hand, the AND 34 output line has a binary value of zero, then the two instructions are not compoundable. Thus, there is produced on the AND 34 output line a first compoundability signal M01 which indicates whether or not Instructions 0 and 1 may be processed in parallel. This M01 signal is supplied to the tag generator 26.

The output lines from the second compatibility logic 31 and the second dependency logic 33 are connected to the two inputs of AND circuit 35. AND 35 produces on its output line a second compoundability signal M12 which has a binary value of one if the two op codes being considered (op codes for Instructions 1 and 2) are compatible and if there are no register dependencies for Instructions 1 and 2 or register dependencies that can be executed by the data dependency collapsing hardware. Otherwise, the AND 35 output line has a binary value of zero. The output line from AND 35 runs to a second input of the tag generator 26.

The other compound analyzers 23-25 shown in FIG. 3 are of the same internal construction as shown in FIG. 4 for the first compound analyzer 22.

Figure 5:
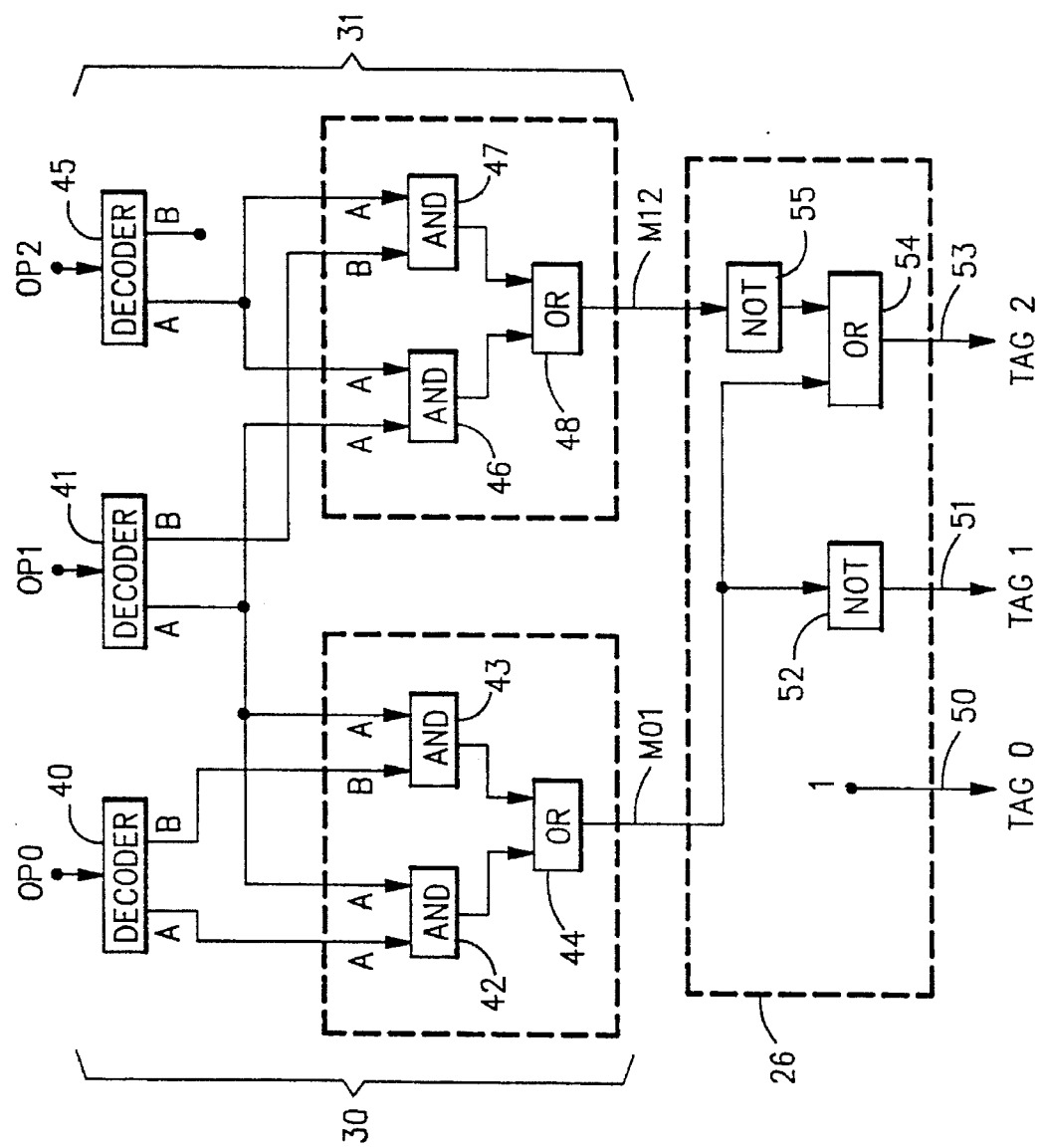
FIG. 5 shows an example of logic circuitry that may be used to implement the compound analyzer and tag generator portions of FIG. 3 which produce the compounding tags for the first three instructions in the instruction stream.

Referring now to FIG. 5, there is shown an example of the logic circuitry that can be used to implement the compound analyzer 22 and the portion of the tag generator 26 which is used to generate the first three tags, Tag 0, Tag 1 and Tag 2. For the example of FIG. 5, it is assumed that there are two categories of instructions which are designated as category A and category B. The rules for compounding these categories of instructions are assumed to be as follows:

(1) A can always compound with A (2) A can never compound with B (3) B can never compound with B (4) B can always compound with A (5) Rule (4) has preference over Rule (1).

Note that these rules are sensitive to the order of occurrence of the instructions.

It is further assumed that these rules are such that when they are observed, there will be no problems with register dependencies because the rules implicitly indicate that in case there is any interlock, such an interlock is always executable by the data dependency collapsing hardware. In other words, it is assumed for the FIG. 5 example, that the register dependency logics 32 and 33 of FIG. 4 are not needed. In such case, AND circuits 34 and 35 are also not needed and the output of logic 30 becomes the M01 signal and the output of logic 31 becomes the M12 signal.

For these assumptions, FIG. 5 shows the internal logic circuitry that may be used for the instruction compatibility logic 30 and the instruction compatibility logic 31 of FIG. 4. With reference to FIG. 5, the instruction compatibility logic 30 includes decoders 40 and 41, AND circuits 42 and 43 and OR circuit 44. The second instruction compatibility logic 31 includes decoders 41 and 45, AND circuits 46 and 47 and OR circuit 48. The middle decoder 41 is shared by both logics 30 and 31.

The first logic 30 examines the op codes OP0 and OP1 of Instructions 0 and 1 to determine their compatibility for parallel execution purposes. This is done in accordance with Rules (1)–(4) set forth above. Decoder 40 looks at the op code of the first instruction and if it is a category A op code, the A output line of decoder 40 is set to the one level. If OP0 is a category B op code, then the B output line of decoder 40 is set to a one level. If OP0 belongs to neither category A nor category B, then both outputs of decoder 40 are at the binary zero level. The second decoder 41 does a similar kind of decoding for the second op code OP1.

AND circuit 42 implements Rule (1) above. If OP0 is a category A op code and OP1 is also a category A op code, then AND 42 produces a one level output. Otherwise, the output of AND 42 is a binary zero level. AND 43 implements Rule (4) above. If the first op code is a category B op code and the second op code is a category A op code, then AND 43 produces a one level output. Otherwise, it produces a zero level output. If either AND 42 or AND 43 produces a one level output, this drives the output of OR circuit 44 to the one level, in which case, the compoundability signal M01 has a value of one. This one, value indicates that the first and second instructions (Instructions 0 and 1) are compatible for parallel execution purposes.

If any other combination of op code categories is detected by decoders 40 and 41, then the outputs of AND 42 and AND 43 remain at the zero level and compoundability signal M01 has the noncompoundability-indicating value of zero. Thus, the occurrence of the combinations indicated by Rules (2) and (3) above do not satisfy AND's 42 and 43 and M01 remains at the zero level. If there are further catorgories of op codes in addition to catorgories A and B, their occurrences in the instruction stream do not activate the outputs of decoders 40 and 41. Hence, they likewise result in an M01 compoundability signal value of zero.

The second instruction compatibility logic 31 performs a similar type of op code analysis for the second and third instructions (Instructions 1 and 2). If the second op code OP1 is a category A op code and the third op code OP2 is a category A opcode, then, per Rule (1), AND 46 produces a one level output and the second compoundability signal M12 is driven to the compoundability-indicating binary one level. If, on the other hand OP1 is a category B opcode and OP2 is a category A opcode, then, per Rule (4), AND 47 is activated to produce a binary one level for the second compoundability signal M12. For any op code combinations other than those set forth in Rules (1) and (4), the M12 signal has a value of zero.

The M01 and M12 compoundability signals are supplied to the tag generator 26. FIG. 5 shows the logic circuitry that can be Used in tag generator 26 to respond to the M01 and M12 compoundability signals to produce the desired tag bit values for Tags 0,1 and 2. The table of FIG. 6 shows the logic which is implemented by the tag generator 26 for Tags 0,1 and 2. A tag bit value of one indicates that the associated instruction is a "first" instruction for parallel execution purposes. A tag bit value of zero indicates that the associated instruction is a "second" instruction for parallel execution purposes. The only instruction pairs which are compounded and executed in parallel are those for which the first instruction in the pair has a tag bit value of one and the second instruction in the pair has a tag bit value of zero. Any instruction having a tag bit value of one which is followed by another instruction having a tag bit value of one is executed by itself in a singular manner and not in parallel with the following instruction.

For the case of the first row in FIG. 6, all three tag bits have a value of one. This means that each of Instructions 0 and 1 will be executed in a singular, nonparallel manner. For the second row of FIG. 6, Instructions 0 and 1 will be executed in parallel since Tag 0 has the required one value and Tag 1 has the required zero value. For the third row in FIG. 6, Instruction 0 will be executed in a singular manner, while Instructions 1 and 2 will be executed in parallel with one another. For the fourth row, Instructions 0 and 1 will be executed in parallel with one another.

For those cases where Tag 2 has a binary value of one, the status of its associated Instruction 2 is dependent on the binary value for Tag 3. If Tag 3 has a binary value of zero, then Instructions 2 and 3 can be executed in parallel. If, on the other hand, Tag 3 has a binary value of one, then Instruction 2 will be executed in a singular, nonparallel manner. It is noted that the logic implemented for the tag generator 26 does not permit the occurrence of two successive tag bits having binary values of zero.

An examination of FIG. 6 reveals the logic needed to be implemented by the portion of tag generator 26 shown in FIG. 5. As indicated in FIG. 6, Tag 0 will always have a binary value of one. This is accomplished by providing a constant binary value of one to tag generator output line 50 which constitutes the Tag 0 output line. An examination of FIG. 6 further reveals that the bit value for Tag 1 is always the opposite of the bit value of the M01 compoundability signal. This result is accomplished by connecting output line 51 for Tag 1 to the output of NOT circuit 52, the input of Which is connected to the M01 signal line.

The binary level on Tag 2 output line 53 is determined by an OR circuit 54 and a NOT circuit 55. One input of OR 54 is connected to the M01 line. If M01 has a value of one, then Tag 2 has a value of one. This takes care of the Tag 2 values in the second and fourth rows of FIG. 6. The other input of OR 54 is connected by way of NOT 55 to the M12 signal line. If M12 has a binary value of zero, this value is inverted by NOT 55 to supply a binary one value to the second input of OR 54. This causes the Tag 2 output line 53 to have a binary one value. This takes care of the Tag 2 value for row one of FIG. 6. Note that for the row 3 case, Tag 2 must have a value of zero. This will occur because, for this case, M01 will have a value of zero and M12 will have a value of one which is inverted by NOT 55 to produce a zero at the second input of OR 54.

Implicit in the logic of FIG. 6 is a prioritization rule for the row four case where each of M01 and M12 has a binary value of one. This row four case can be produced by an instruction category sequence of BAA. This could be implemented by a tag sequence of 101 as shown in FIG. 6 or, alternatively, by a tag sequence of 110. In the present embodiment, Rule (5) is followed and the 101 sequence shown in FIG. 6 is chosen. In other words, the BA pairing is given preference over the AA pairing.

The 1,1 pattern for M01 and M12 can also be produced by an op code sequence of AAA. In this case, the 101 tag sequence of FIG. 6 is again selected. This is better because it provides a one value for Tag 2 and, hence, potentially enables Instruction 2 to be compounded with Instruction 3 if Instruction 2 is compatible with Instruction 3.

DESCRIPTION OF THE FIG. 7 EMBODIMENT

Figure 7:
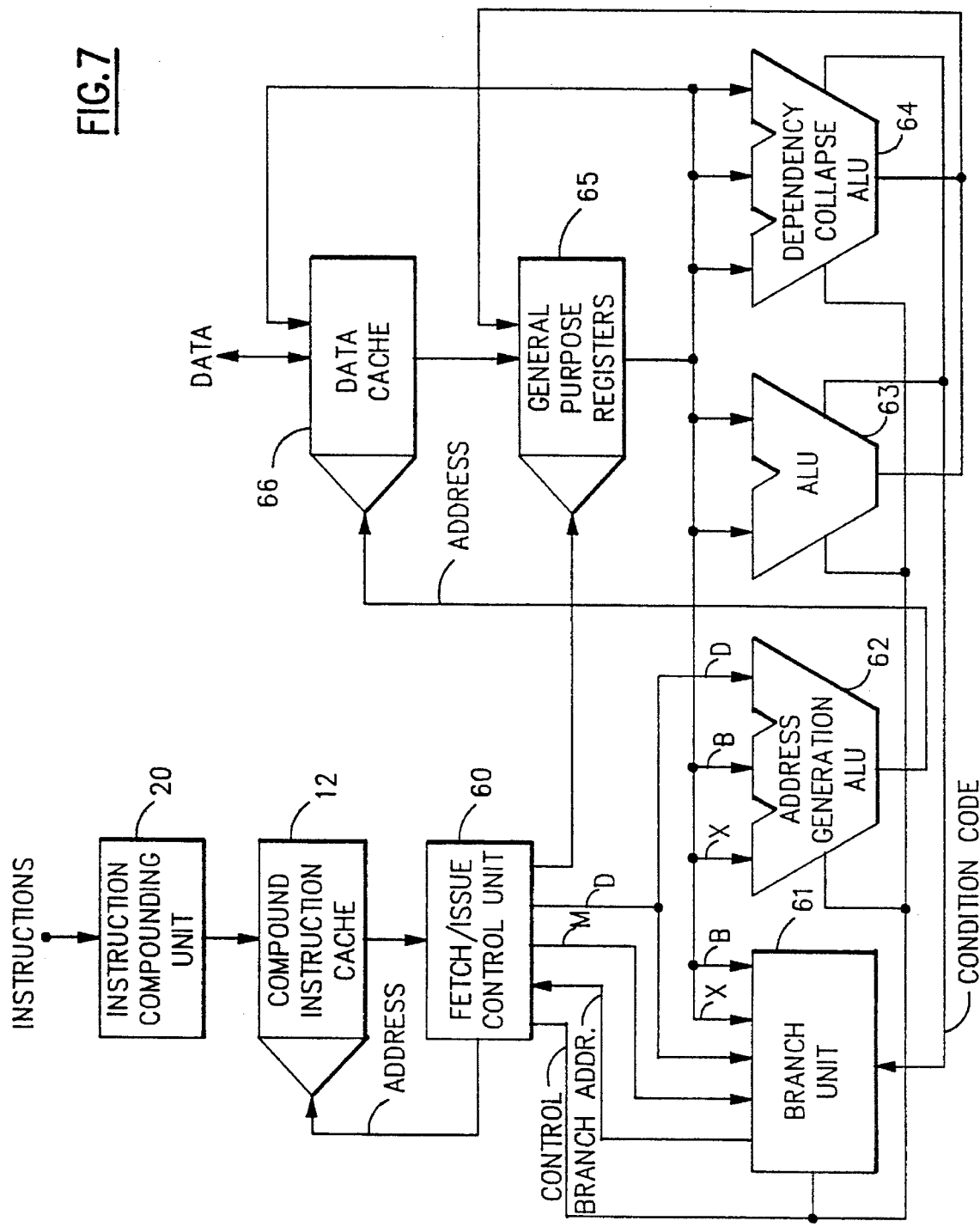
FIG. 7 shows a representative embodiment of a portion of a digital computer system and is used to explain how the compounded instructions may be processed in parallel by multiple functional instructions processing units.

Referring to FIG. 7, there is shown a detailed example of how a computer system can be constructed for using the compounding tags of the present invention to provide parallel processing of machine-level computer instructions. The instruction compounding unit 20 used in FIG. 7 is assumed to be of the type described in FIG. 3 and, as such, it adds to each instruction a one-bit tag field. These tag fields are used to identify which pairs of instructions may be processed in the parallel. These tagged instructions are supplied to and stored into the compound instruction cache 12. Fetch/Issue control unit 60 fetches the tagged instructions from cache 12, as needed, and arranges for their processing by the appropriate one or ones of a plurality of functional instruction processing units 61, 62, 63 and 64. Fetch/Issue unit 60 examines the tag fields and op code fields of the fetched instructions. If the tag fields indicate that two successive instructions may be processed in parallel, then fetch/issue unit 60 assigns them to the appropriate ones of the functional units 61-64 as determined by their op codes and they are processed in parallel by the selected functional units. If the tag fields indicate that a particular instruction is to be processed in a singular, nonparallel manner, then fetch/issue unit 60 assigns it to a particular functional unit as determined by its op code and it is processed or executed by itself.

The first functional unit 61 is a branch instruction processing unit for processing branch type instructions. The second functional unit 62 is a three input address generation arithmetic and logic unit (ALU) which is used to calculate the storage address for instructions which transfer operands to or from storage. The third functional unit 63 is a general purpose arithmetic and logic unit (ALU) which is used for performing mathematical and logical type operations. The fourth functional unit 64 in the present example is a data dependency collapsing ALU of the kind described in the above-referenced copending application Ser. No: 07/504, 190, (IBM Docket EN9-90-014). This dependency collapsing ALU 64 is a three-input ALU capable of performing two arithmetical/logical operations in a single machine cycle.

The computer system embodiment of FIG. 7 also includes a set of general purpose registers 65 for use in executing some of the machine-level instructions. Typically, these general purpose registers 65 are used for temporarily storing data operands and address operands or are used as counters or for other data processing purposes. In a typical computer system, sixteen (16) such general purpose registers are provided. In the present embodiment, general purpose registers 65 are assumed to be of the multiport type wherein two or more registers may be accessed at the same time.

The computer system of FIG. 7 further includes a high-speed data cache storage mechanism 66 for storing data operands obtained from the higher-level storage unit 10. Data in the cache 66 may also be transferred back to the higher-level storage unit 10. Data cache 66 may be of a known type and its operation relative to the higher-level storage 10 may be conducted in a known manner.

Figures 8, 9:
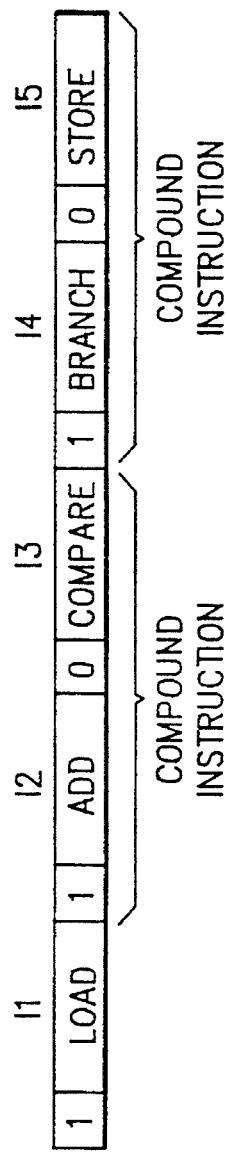
FIG. 8 shows an example of a particular sequence of instructions which may be processed by the computer system of FIG. 7.
FIG. 9 is a table used in explaining the processing of the FIG. 8 instruction sequence by the computer system of FIG. 7.

FIG. 8 shows an example of a compounded or tagged instruction sequence which may be processed by the computer system of FIG. 7. The FIG. 8 example is composed of the following instructions in the following sequence: Load, Add, Compare, Branch on Condition and Store. These are identified as instructions I1–I5, respectively. The tag bits for these instructions are 1,1,0,1 and 0, respectively. Because of the organization of the machine shown in FIG. 7, the Load instruction is processed in a singular manner by itself. The Add and Compare instructions are treated as a compound instruction and are processed in parallel with one another. The Branch and Store instructions are also treated as a compound instruction and are also processed in parallel with one another.

The table of FIG. 9 gives further information on each of these FIG. 8 instructions. The R/M column in FIG. 9 indicates the content of a first field in each instruction which is typically used to identify the particular one of general purpose registers 65 which contains the first operand. An exception is the case of the Brafich on Condition instruction, wherein the R/M field contains a condition code mask. The R/X column in FIG. 9 indicates the content of a second field in each instruction, which field is typically used to identify a second one of the general purpose registers 65. Such register may contain the second operand or may contain an address index value (X). The B column in FIG. 9 indicates the content of a third possible field in each instruction, which field may identify a particular one of the general purpose registers 65 which contains a base address value. A zero in the B column indicates the absence of a B field or the absence of a corresponding address component in the B field. The D field of FIG. 9 indicates the content of a further field in each instruction which, when used for address generation purposes, includes an address displacement value. A zero in the D column may also indicate the absence of a corresponding field in the particular instruction being considered or, alternatively, an address displacement value of zero.

Considering now the processing of the Load instruction of FIG. 8, the fetch/issue control unit 60 determines from the tag bits for this Load instruction and the following Add instruction that the Load instruction is to be processed in a singular manner by itself. The action to be performed by this Load instruction is to fetch an operand from storage, in this case the data cache 66, and to place such operand into the R2 general purpose register. The storage address from which this operand is to be fetched is determined by adding together the index value in register X, the base value in register B and the displacement value D. The fetch/issue control unit 60 assigns this address generation operation to the address generation ALU 62. In this case, ALU 62 adds together the address index value in register X (a value of zero in the present example), the base address value contained in general purpose register R7 and the displacement address value (a value of zero in the present example) contained in the instruction itself. The resulting calculated storage address appearing at the output of ALU 62 is supplied to the address input of data cache 66 to access the desired operand. This accessed operand is loaded into the R2 general purpose register in register set 65.

Considering now the processing of the Add and Compare instructions, these instructions are fetched by the fetch/issue control unit 60. The control unit 60 examines the compounding tags for these two instructions and notes that they may be executed in parallel. As seen from FIG. 9, the Compare instruction has an apparent data dependency on the Add instruction since the Add must be completed before R3 can be compared. This dependency, however, can be handled by the data dependency collapsing ALU 64. Consequently, these two instructions can be processed in parallel in the FIG. 7 configuration. In particular, the control unit 60 assigns the processing of the Add instruction to ALU 63 and assigns the processing of the Compare instruction to the dependency collapsing ALU 64.

ALU 63 adds the contents of the R2 general purpose register to the contents of the R3 general purpose register and places the result of the addition back into the R3 general purpose register. At the same time, the dependency collapsing ALU 64 performs the following mathematical operation:

$$R3+R2-R4$$

The condition code for the result of this operation is sent to a condition code register located in branch unit 61. The data dependency is collapsed because ALU 64, in effect, calculates the sum of R3+R2 and then compares this sum with R4 to determine the condition code. In this manner, ALU 64 does not have to wait on the results from the ALU 63 which is performing the Add instruction. In this particular case, the numerical results calculated by the ALU 64 and appearing at the output of ALU 64 is not supplied back to the general purpose registers 65. In this case, ALU 64 merely sets the condition code.

Considering now the processing of the Branch instruction and the Store instruction shown in FIG. 8, these instructions are fetched from the compound instruction cache 12 by the fetch/issue control unit 60. Control unit 60 determines from the tag bits for these instructions that they may be processed in parallel with one another. It further determines from the op codes of the two instructions that the Branch instruction should be processed by the branch unit 61 and the Store instruction should be processed by the address generation ALU 62. In accordance with this determination, the mask field. M and the displacement field D of the Branch instruction are supplied to the branch unit 61. Likewise, the address index value in register X and the address base value in register B for this Branch instruction are obtained from the general purpose registers 65 and supplied to the branch unit 61. In the present example, the X value is zero and the base value is obtained from the R7 general purpose register. The displacement value D has a hexadecimal value of twenty, while the mask field M has a mask position value of eight.

The branch unit 61 commences to calculate the potential branch address (0+R7+20) and at the same time compares the condition code obtained from the previous Compare instruction with the condition code mask M. If the condition code value is the same as the mask code value, the necessary branch condition is met and the branch address calculated by the branch unit 61 is thereupon loaded into an instruction counter in control unit 60. This instruction counter controls the fetching of the instructions from the compound instruction cache 12. If, on the other hand, the condition is not met (that is, the condition code set by the previous instruction does not have a value of eight), then no branch is taken and no branch address is supplied to the instruction counter in control unit 60.

At the same time that the branch unit 61 is busy carrying out its processing actions for the Branch instruction, the address generation ALU 62 is busy doing the address calculation (0+R7+0) for the Store instruction. The address calculated by ALU 62 is supplied to the data cache 66. If no branch is taken by the branch unit 61, then the store instruction operates to store the operand in the R3 general purpose register into the data cache 66 at the address calculated by ALU 62. If, on the other hand, the branch condition is met and the branch is taken, then the contents of the R3 general purpose register is not stored into the data cache 66.

The foregoing instruction sequence of FIG. 8 is intended as an example only. The computer system embodiment of FIG. 7 is equally capable of processing various and sundry other instruction sequences. The example of FIG. 8, however, clearly shows the utility of the compound instruction tags in determining which pairs of instructions may be processed in parallel with one another.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. In a digital computer system capable of processing two or more instructions in parallel, the combination comprising:

a larger capacity, lower-speed storage mechanism for storing instructions to be processed;

a smaller-capacity, higher speed mechanism for storing instructions and a plurality of data bits indicating pairs of instructions stored in said memory that can be executed in parallel;

an instruction compounding mechanism having an input means and an output means;

means coupling said input means of said instruction compounding mechanism to an output of said larger-capacity, lower-speed storage mechanism for transferring instructions from said larger-capacity, lower-speed storage mechanism to said instruction compounding mechanism;

said instruction compounding mechanism analyzing dependencies between pairs of instructions and generating said data bits which indicate pairs of instructions that can be executed in parallel based upon said analysis;

means to couple said output means of said instruction compounding unit to an input of said smaller-capacity, higher-speed storage mechanism for transferring instruction pairs and said data bits indicating parallel execution of said instruction pairs to said smaller-capacity, higher-speed storage mechanism prior to an instruction fetch and issue unit issuing a command to fetch an instruction of a pair of instructions;

said smaller-capacity, higher-speed storage mechanism storing said pairs of instructions and said data bits indicating parallel execution of said instruction pairs; and means to couple an instruction pair from said smaller-capacity higher-speed storage mechanism to a functional instruction processing unit in response to said command to fetch an instruction issued by said instruction fetch and issue unit when said data bits indicate parallel execution of said instruction pair.

2. The combination of claim 1 wherein the the higher-speed storage mechanism is a cache storage mechanism.

3. The combination of claim 1 wherein said data bits comprise a plurality of tag fields, a different one of which is associated with each instruction analyzed by the instruction compounding mechanism.

4. The combination of claim 3 wherein the instruction compounding mechanism includes:

a plural-instruction instruction register for receiving a plurality of successive instructions from the lower-speed storage mechanism;

a plurality of rule-based instruction analyzer mechanisms, each of which analyzes a different pair of side-by-side instructions in the instruction register and includes means for producing a compoundability signal which indicates whether or not the two instructions in its pair may be processed in parallel;

and a tag generating mechanism responsive to the compoundability signals for generating the individual tag fields for the analyzed instructions in the instruction register.

5. The combination of claim 4 wherein:

the computer system has a particular instruction processing configuration having a plurality of functional units of one or more types;

and each instruction analyzer mechanism includes logic circuitry for implementing rules which define which types of instructions are compatible for parallel execution in the particular instruction processing configuration used for the computer system, such logic circuitry providing said means for producing the compoundability signal for that analyzer mechanism.

6. The digital computer system as in claim 4, wherein said tag information comprises one or more bits indicating whether an instruction with which the tag is associated may be executed in parallel and which indicates which instructions may be processed in parallel with one another or the instruction must be processed alone.

7. The combination of claim 1 wherein the computer system includes a plurality of functional instruction processing units which operate in parallel with one another and wherein the data bite generated by the instruction compounding mechanism are used in causing the issuance of two or more instructions in parallel from the higher-speed storage mechanism to appropriate ones of the functional units which can perform the required function for the issuing instructions.

8. The digital computer system as in claim 7 wherein means coupling said input means of said instruction compounding mechanism to an output Of said larger-capacity, lower-speed storage mechanism for transferring instructions from said larger-capacity, lower-speed storage mechanism to said instruction compounding mechanism transfers said instructions in unmodified object code.

9. The combination of claim 8 wherein the instruction compounding mechanism includes:

a plural-instruction instruction register for receiving a plurality of successive instructions from the lower-speed storage mechanism;

a plurality of rule-based instruction analyzer mechanisms, each of which analyzes a different pair of side-by-side instructions i the instruction register and includes means for producing a compoundability signal which indicates whether or not th two instructions in its pair may be processed in parallel;

and a tag generating mechanism responsive to the compoundability signals for generating th individual tag fields for the analyzed instructions in the instruction register.

10. The combination of claim 9 wherein:

the computer system has a particular instruction processing configuration having a plurality of functional units of one or more types;

and each instruction analyzer mechanism includes logic circuitry for implementing rules which define which types of instructions are compatible for parallel execution in the particular instruction processing configuration used for the computer system, such logic circuitry providing said means for producing the compoundability signal for that analyzer mechanism.

11. The digital computer system as in claim 1, wherein the instruction compounding mechanism includes:

a plural-instruction instruction register for receiving a plurality of successive instructions from the lower-speed storage mechanism;

a plurality of rule-based instruction analyzer mechanisms, each of which analyzes a different pair of side-by-side instructions with unmodified object code in the instruction register and produces a compoundability signal which indicates whether or not the two instructions in its pair may be processed in parallel; and a tag generating mechanism responsive to the compoundability signals for generating the individual tag fields for the different instructions of unmodified object code in the instruction register.

12. The combination of claim 1 wherein:

the computer system has a particular instruction processing configuration;

and each instruction analyzer mechanism includes logic circuitry for implementing rules which define which types of instructions are compatible for parallel execution in the particular instruction processing configuration used for the computer system, such logic circuitry producing the compoundability signal for that analyzer mechanism.

13. The digital computer system as in claim 1, wherein means coupling said input means of said instruction compounding mechanism to an output of said larger-capacity, lower-speed storage mechanism for transferring instructions from said larger-capacity, lower-speed storage mechanism to said instruction compounding mechanism transfers said instructions in unmodified object code.

14. The digital computer system as in claim 1 wherein said data bits indicating parallel execution of said instruction pairs comprise a binary data bit associated with each instruction, said binary data bit indicating in one of its states that an associated instruction is a first instruction of a compoundable pair of instructions and said binary data bit indicating in its other state that an associated instruction is a second instruction of a compoundable pair of instructions, a pair of instructions indicated as compoundable only when a binary data bit associated with a first instruction is in said one state and a binary data bit associated with a second instruction is in said other state.

* * * * *

UNITED STATES PATENT AND TRADEMARK OFFICE
CERTIFICATE OF CORRECTION

PATENT NO. : 5,475,853
DATED : December 12, 1995
INVENTOR(S) : Bartholomew Blaner et al.

It is certified that error appears in the above-identified patent and that said Letters Patent is hereby corrected as shown below:

Col 1 Line 16      Delete "07/579,384" and insert --07/519,384 --

Col 14 Line 62      Delete "bite" and insert --bits--
claim 7

Col 15 Line 3      Delete "Of" and insert --of--
claim 8

Signed and Sealed this

Eleventh Day of May, 1999

Attest:

Q. TODD DICKINSON

Attesting Officer      Acting Commissioner of Patents and Trademarks